United States Patent
Kettler

(10) Patent No.: US 8,760,654 B2
(45) Date of Patent: Jun. 24, 2014

(54) METHOD FOR COLOR MATCHING

(75) Inventor: Wilhelm Kettler, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 290 days.

(21) Appl. No.: 13/060,495

(22) PCT Filed: Sep. 25, 2009

(86) PCT No.: PCT/US2009/058348
§ 371 (c)(1),
(2), (4) Date: Feb. 24, 2011

(87) PCT Pub. No.: WO2010/036874
PCT Pub. Date: Apr. 1, 2010

(65) Prior Publication Data
US 2011/0160892 A1    Jun. 30, 2011

Related U.S. Application Data

(60) Provisional application No. 61/194,621, filed on Sep. 29, 2008.

(51) Int. Cl.
*G01J 3/46* (2006.01)
*G01J 3/52* (2006.01)

(52) U.S. Cl.
CPC .. *G01J 3/463* (2013.01); *G01J 3/46* (2013.01); *G01J 3/465* (2013.01); *G01J 3/52* (2013.01)
USPC ........................................................ 356/402

(58) Field of Classification Search
USPC .................. 356/402–425, 300–326
See application file for complete search history.

(56) References Cited

U.S. PATENT DOCUMENTS

| 4,887,217 A | * | 12/1989 | Sherman et al. | .............. 700/117 |
| 6,583,878 B2 | | 6/2003 | Hustert | |
| 2002/0167663 A1 | | 11/2002 | Martino et al. | |
| 2003/0004229 A1 | * | 1/2003 | Schermacher et al. | ....... 523/303 |
| 2007/0133000 A1 | | 6/2007 | Martino et al. | |

FOREIGN PATENT DOCUMENTS

| DE | 2525701 A1 | 12/1976 |
| GB | 1589705 | 5/1981 |
| WO | 02063556 A2 | 8/2002 |
| WO | 02063557 A2 | 8/2002 |
| WO | 2008024295 A2 | 2/2008 |

OTHER PUBLICATIONS

ISA, EPO, International Search Report and Written Opinion for Application No. PCT/US2009/058348, mailed Dec. 9, 2009.

(Continued)

*Primary Examiner* — Gregory J Toatley
*Assistant Examiner* — Hina F Ayub
(74) *Attorney, Agent, or Firm* — Ingrassia Fisher & Lorenz, P.C.

(57) ABSTRACT

The invention relates to a method for matching the color of a dry color shade standard, said method comprising the steps of A) Measuring the dry color shade standard, B) Calculating a recipe for the dry color shade standard, C) Generating a virtual wet color shade standard based on the recipe for the dry color shade standard calculated in step B), wherein the virtual wet color shade standard is generated with wet characterization data and D) Matching the virtual wet color shade standard. The method can be used for elaboration of color shades and batch adjustment in production of paints.

8 Claims, 6 Drawing Sheets

(56) References Cited

OTHER PUBLICATIONS

ISA, EPO, International Preliminary Report on Patentability for Application No. PCT/US2009/058348, mailed Mar. 29, 2011.

SIPO, Chinese Office Action for Application No. 2009801385206, mailed Aug. 29, 2013, (Chinese and English versions).

Klein, G.A., "Recipe Prediction," Industrial Color Physics, 2010, pp. 381-446, Springer Series in Optical Sciences, vol. 154.

* cited by examiner

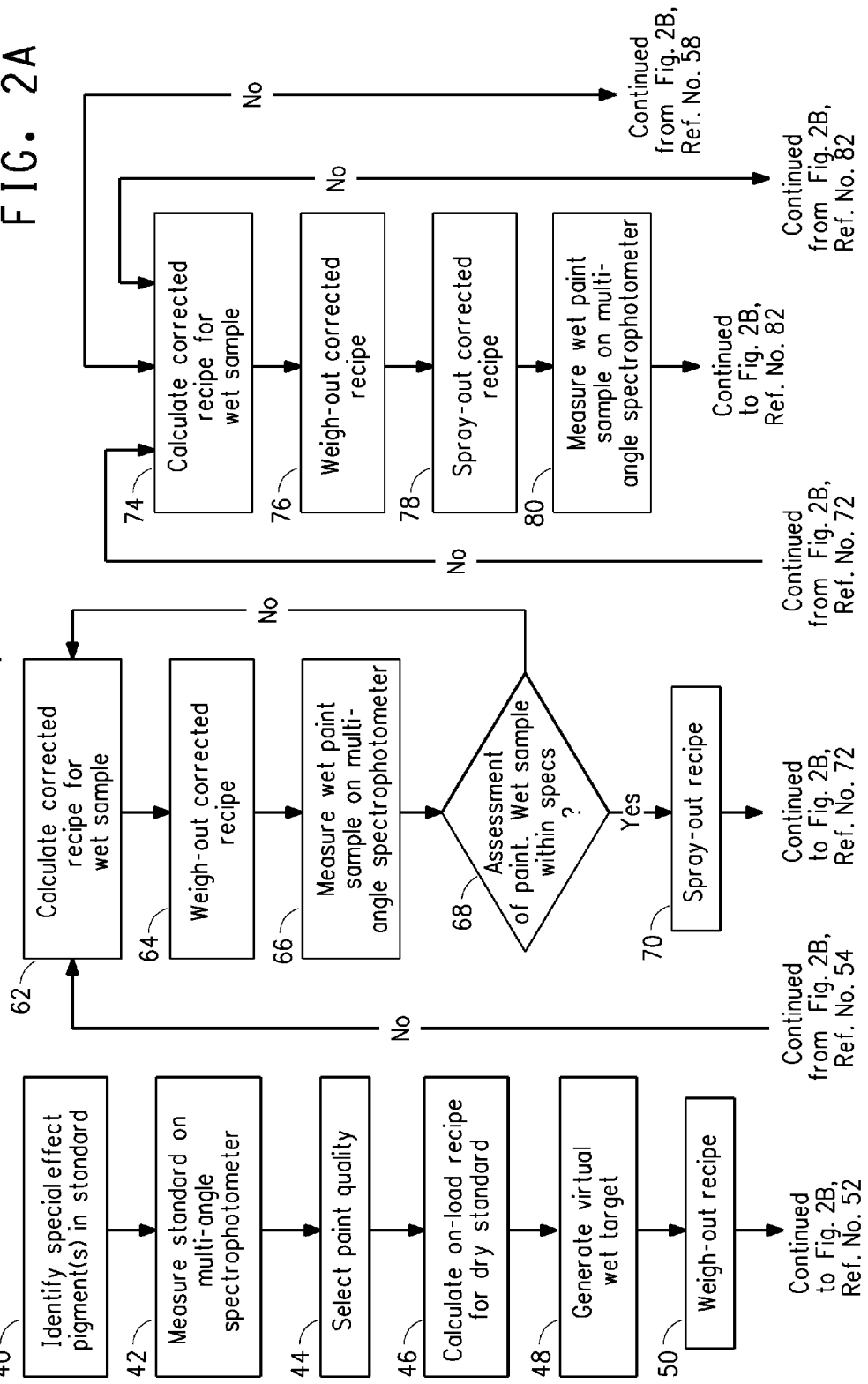

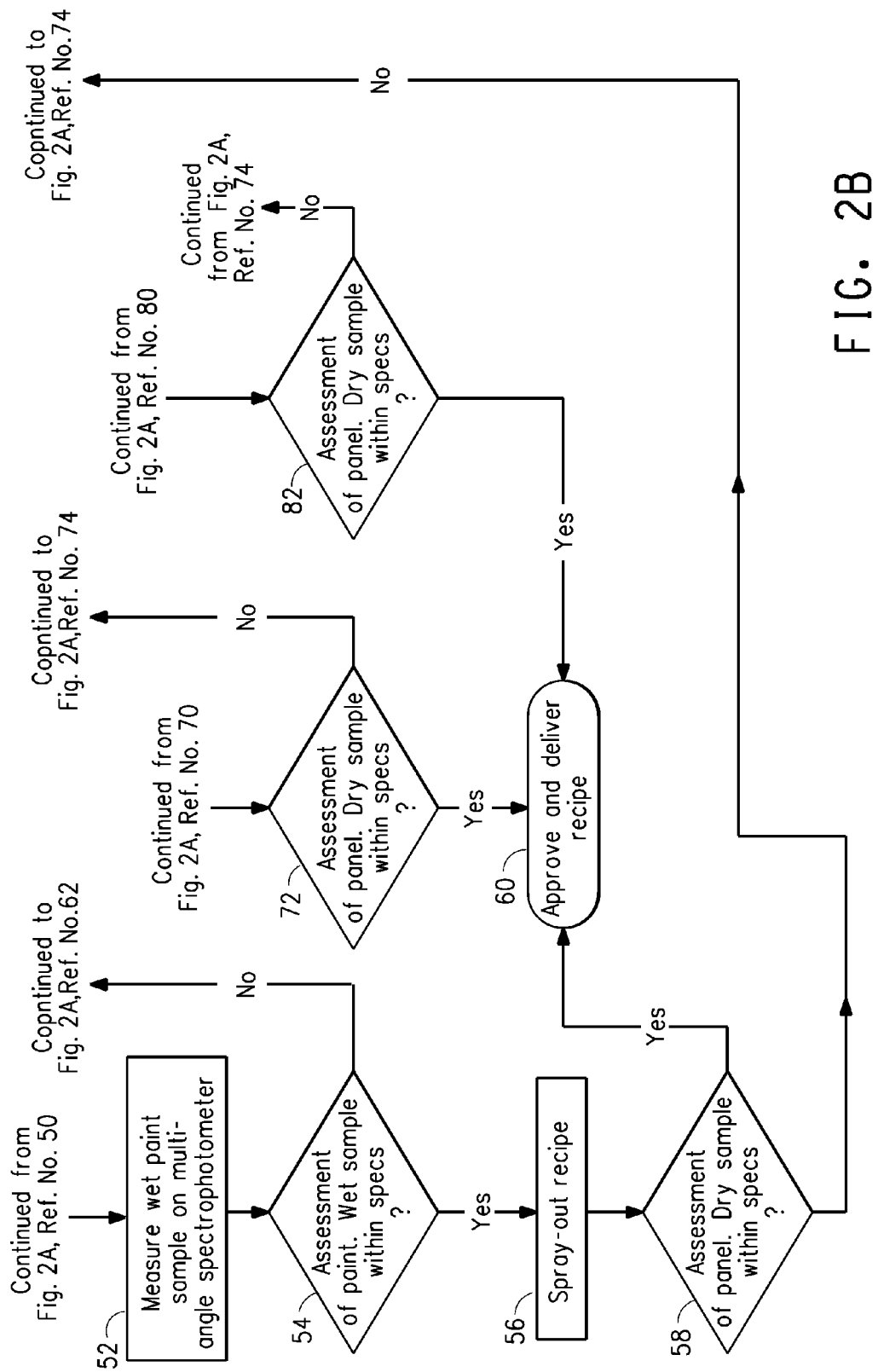

METHOD FOR COLOR MATCHING

FIELD OF INVENTION

The invention relates to a method for matching the color of a color shade standard. The process has applications in the field of color-imparting and special-effect-imparting surface coatings, in particular in automotive coatings. It can be used in color laboratories or refinish body shops, in particular in matching color shades of unknown pigmentation, as well as in production of paints in matching paint batches to a defined color shade standard.

DESCRIPTION OF RELATED ART

In the paint industry the development of colors for the automotive industry in general is a complex, time-consuming, and expensive process. The complexity of a color matching process stems from the fact that color measurement data, characterisation data for every paint line in question, and historical paint formulations have to be dealt with. In order to be competitive highly efficient methods have to be utilised in color development processes in coloristic laboratory, production environment, and refinish applications in body-shops. The usage of instrumental tools is a prerequisite to efficiently matching color shades within tight tolerances frequently specified by customers of paint manufacturers.

The matching process of colors is an iterative multi-step procedure, where in a first step a given standard of unknown pigmentation is matched in a chosen paint quality by means of a recipe calculation program. In a standard procedure the obtained recipe is mixed, sprayed-out, and dried in an oven at elevated temperatures required by the chemistry of the paint quality. If the final result meets the target of the standard within tolerance, the color matching process is finished. However, if the residual color difference between standard and sample exceeds the specified tolerance, the sprayed-out recipe has to be measured and instrumentally corrected. The corrected recipe again has to be sprayed-out and dried and assessed. These steps have to be repeated as long as the sample formulation does not meet the specified target area of the standard.

The current color development or batch shading processes extensively make use of sprayed-out panels at each correction step. Only in those cases where a wet standard is available, e.g. in the production area, wet color measurement technology is used for shading purposes. In color development typically carried out in coloristic laboratories to match a standard of unknown pigmentation, dry panels have to be produced at each correction and approval step, since no wet standard is available. The step of spraying out panels is much more expensive and time consuming than performing a wet color measurement. In case of solid colors the average number of correction steps is of the order of 3-4, while in case of gonio-apparent colors about 8 correction steps have to be expected on the average. Therefore, it would be highly desirable to make the entire color development process more efficient.

The objective of the present invention was therefore to improve the efficiency of shading processes. In particular the objective of the present invention was to provide a time and cost-saving method for matching reference color formulations to a defined dry color shade standard.

SUMMARY OF THE INVENTION

The present invention describes a method for matching the color of a dry color shade standard by defining a virtual wet standard which can be used in color development or batch shading processes to switch from a dry to a wet target.

The present invention is directed to a method for matching the color of a dry color shade standard, said method comprising the steps of:

A) Measuring the dry color shade standard,
B) Calculating a recipe for the dry color shade standard or identifying a matching recipe for the dry color shade standard, for example, from a database,
C) Generating a virtual wet color shade standard based on the recipe for the dry color shade standard calculated or identified in step B), wherein the virtual wet color shade standard is generated with wet characterisation data and
D) Matching the virtual wet color shade standard.

According to one embodiment the method, in particular step D), further comprises the steps of:

E) Preparing a paint composition according to the recipe for the dry color shade standard calculated or identified in step B),
F) Measuring the liquid paint composition prepared in step E) and
G) Assessing the quality of match by comparing the measurement result of step F) with the virtual wet standard generated in step C).

According to a further embodiment the method further comprising the steps of:

H) If the liquid paint composition prepared in step E) is not within a requested tolerance, calculating a corrected recipe for said liquid paint composition,
I) Preparing a paint composition according to the corrected recipe for the liquid paint composition calculated in step H),
J) Measuring the liquid paint composition prepared in step I) and
K) Assessing the quality of match by comparing the measurement result of step J) with the virtual wet standard generated in step C) and
L) Repeating steps H) to K) until the liquid paint composition is within a requested tolerance.

According to a further embodiment The method further comprising the steps of:

M) If the liquid paint composition prepared in step E) or I) is within a requested tolerance, applying the paint composition prepared in step E) or I) to a substrate and drying the paint composition,
N) Assessing the quality of match by comparing the dried paint composition with the dry color shade standard,
O) Calculating a corrected recipe for the dried paint composition, if the dried paint composition is not within a requested tolerance,
P) Preparing a paint composition according to the corrected recipe for the dried paint composition calculated in step O),
Q) Applying the paint composition prepared in step P) to a substrate and drying the paint composition,
R) Assessing the quality of match by comparing the dried paint composition with the dry color shade standard, and
S) Repeating steps O) to R) until the dried paint composition is within a requested tolerance.

It goes without saying that the method of the present invention is applicable if the first tinting step in a color matching process doesn't lead to an acceptable result, i.e., if the sprayed out and dried paint or the liquid paint formulated on the basis of the identified or calculated recipe for the color shade standard doesn't match the corresponding color shade standard and the difference is not acceptable. It also goes without saying that the method of the present invention includes several repeating steps as long as the prepared wet or dry paint is not within a requested tolerance compared with the virtual wet standard or the dry color shade standard.

BRIEF DESCRIPTION OF DRAWINGS

FIG. 2 is a schematic flow diagram of the process of the present invention combining steps with dry panels and steps with liquid paint.

DETAILED DESCRIPTION OF THE EMBODIMENTS

Figure 1:
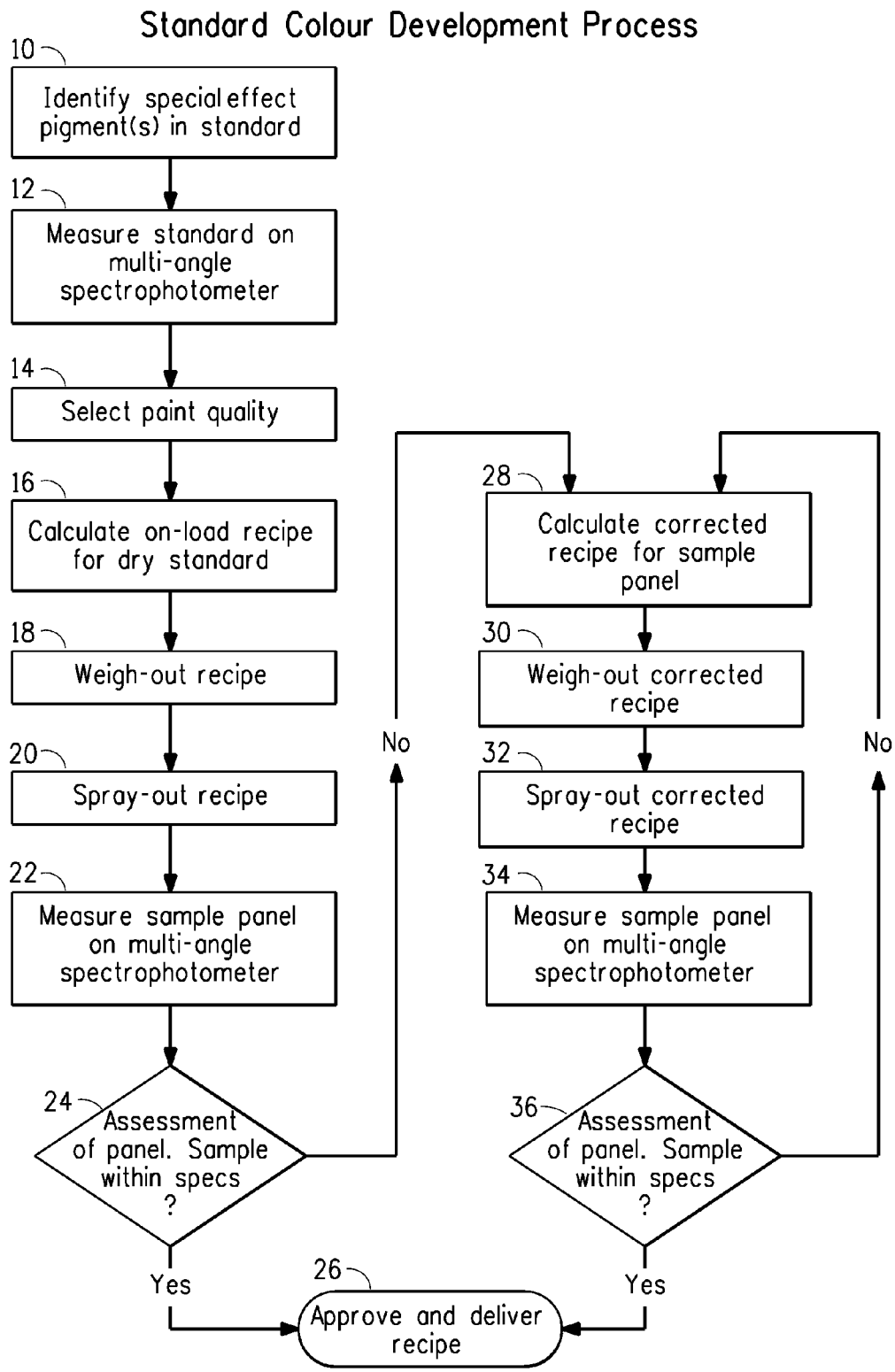
FIG. 1 is a schematic flow diagram of a standard color development process using dry panels.

The invention will be explained in greater detail below.

The term "reflection spectrum" shall mean reflection spectrum in case of solid color shades and reflection surface in case of special effect color shades.

Colorant system should be understood to mean any system of absorption pigments and/or special-effect pigments comprising all pigments which shall be used for the production or formulation of paints. The number and choice of pigment components are not subject to restrictions here. They may be adapted in any manner to the relevant requirements, e.g. according to the requirements of the paint manufacturer or its customers.

Dry color shade standard should be understood to mean an applied and dried paint standard, i.e. a cured or dried paint layer on a substrate, or any other dry color standard of arbitrary character. Dry paint should be understood to mean an applied and dried paint. The dried paint may also be referred to as sprayed out paint, dry paint or cured paint.

Wet color shade standard should be understood to mean a wet paint standard that is not dried or cured. Liquid paint should be understood to mean a liquid paint that is not dried or cured.

Color shade standard may also be referred to as color standard.

Wet characterisation data or wet characterisation data set should be understood to mean the optical material parameters determined for each constituent of a given colorant system in a given liquid paint quality.

Dry characterisation data or dry characterisation data set should be understood to mean the optical material parameters determined for each constituent of a given colorant system in a given dry paint quality.

A prerequisite of any recipe prediction system is the knowledge of the optical material parameters of all colored constituents of a given colorant system for a given pigment mixture model. Optical material parameters or characterisation data describe the properties of the pigments which are dispersed in a binder system of a particular paint quality. They are dependent on the wavelength and have to be determined within the entire visible spectral range and have to be derived from appropriate calibration panels. The calibration echelon to be prepared for the determination of the optical material parameters by its nature is closely related to the radiative transfer model or pigment mixture model utilised. In the isotropic case (solid pigments) only two parameters, namely the scattering and absorption coefficients, have to be determined. When utilising a pigment mixture model to describe the anisotropic scattering properties of gonioapparent reflective pigments (special effect pigments) further wavelength-dependent material parameters of the chosen model phase scattering function have to be derived. A specific set of calibration panels has to be prepared for each pigment, whose reflectance is measured with a spectroradiometer within the wavelength and angle ranges of interest. The optical material parameters are then derived numerically by adjusting the pigment mixture model to the experimental data of the calibration echelon in the sense of the $L_2$ norm.

The $L_2$-norm is a standard term in mathematical theory used to denote the Euclidean distance $\|x\|_2$ between two positions $x_1=(x_{1,x}, x_{1,y}, x_{1,z}, \ldots, x_{1,n})$ and $x_2=(x_{1,x}, x_{1,y}, x_{1,z}, \ldots, x_{1,n})$ in an n-dimensional space:

$$\|x\|_2 = \sqrt{\sum_{i=1}^{n}(x_{1,i}-x_{2,i})^2} = \sqrt{x_1^T x_2}.$$

In three dimensions (n=3) the above equation simply reads $$\|x\|_2=\sqrt{(x_{1,x}-x_{2,x})^2+(x_{1,y}-x_{2,y})^2+(x_{1,z}-x_{2,z})^2}.$$

This distance measure can be used in the 3-dimensional colour space as well as in an 31-dimensional reflectance space for a single spectrum comprising the wavelength range 400 nm≤λ≤700 nm with a wavelength pitch of 10 nm. A generalization to angular dependent reflectance surfaces is straightforward.

The standard methods in use for instrumental color development or batch shading are for instance described in: Color Physics for Industry, edited by R. McDonald, Society of Dyers and Colorists (Bradford, 1987) and Farbenphysik für industrielle Anwendungen, G. A. Klein (Springer, 2004).

In the relevant literature various model equations of different scopes of application and validity ranges are discussed. For an optimal mathematical treatment of the problem a differentiation is made between isotropic and anisotropic reflecting surface coatings. This division is also adopted in the method of the present invention, although the isotropic case can be viewed as limiting case of the more general model for anisotropic reflecting surface coatings.

The theoretical approaches described below serve to elucidate the methodology and can be replaced by any thinkable form of a general diffusion equation describing the radiative transfer in particulate media. In this context it is worth mentioning the limitation of the represented models to diluted systems, where the phenomenon of dependent scattering does not play an important role. For the case of highly pigmented or concentrated systems in the literature already other forms of the radiative transfer equations have been derived and discussed, whose solutions are considerably more complex and time-consuming from a computational point of view than those approaches described below.

The optical material parameters of the selected approximation of the radiative transfer equation have to be determined by matching an appropriate pigment mixture model in the $L_2$ norm to the experimentally determined reflectance spectra or reflectance surfaces of a set of calibration panels and the corresponding liquid paints.

A sketch of a standard color development process flow is depicted in FIG. 1. The first process step usually consists of a microscopic analysis of a gonioapparent color standard to be matched, whose pigmentation is unknown, to identify platelet-like special effect pigments 10. For solid color shades this pre-analysis is not required. The recipe calculation step is initiated by measuring the reflectance properties of the color standard within the visible spectral range under a single or multiple geometries by means of an appropriate spectrophotometer 12. This spectral target is matched by means of a recipe calculation program, which makes use of a pigment mixture model and the associated optical material parameters derived in advance for the set of available colorants 14, 16. The optimised formula is weighed 18, sprayed, and dried 20 according to the necessities dictated by the chemistry of the binder system. Afterwards the obtained dry paint on the panel is assessed visually and instrumentally in order to validate the quality of the match 22, 24. Due to process errors the sample will not perfectly match the color standard. However, if the match is within the agreed tolerances the color development process is terminated 26. If the match is not acceptable a recipe correction analysis is carried out to reduce the residual color difference between color sample and color standard 28. Again the obtained corrected formula is weighed 30 and sprayed out and dried at elevated temperatures 32. Visual and instrumental assessments of the reflectance properties complete the process step which has to be repeated until the color position of the sample is within the agreed tolerances 34, 36.

The number of cycles needed to match a given color standard depends on various factors as, e.g., the correction methodology, the degree of standardisation of the colorants, the performance of the pigment mixture model, and weighing and spraying variance. Also the accuracy of the measurement process has inherent limitations.

Typical cycle numbers for solid colors are 3-4 and 5-8 for gonioapparent color shades, respectively.

Of all steps described so far the application and forced drying steps represent the most time-consuming and expensive parts of the color development process. Typical time consumption for mixing a paint formulation, applying it onto a panel, and drying the prepared panel in an oven is about 90 to 120 minutes. The color development process could be designed to be more efficient if at least part of the recipe correction steps could be carried out by measurement of liquid paint, eliminating the application and baking process steps. The time-consumption for a liquid paint measurement step is of the order of 15 minutes. This change of paradigms can be accomplished straightforwardly if a liquid standard exists and the wet-to-dry correlation is predictable. Unfortunately, this ideal situation is not applicable to the color development process in coloristic laboratories, where wet standards in general are not available.

Therefore it is a specific advantage of the present invention to provide a new process using a virtual wet standard which allows to switch from a dry to a wet target in color development process. Prerequisite is the availability of a dry as well as a wet characterisation data set that have been prepared prior to the shading process for the given colorant system. Most preferred the dry and the wet characterisation data sets have been prepared and processed based on congruent blend patterns for both dry and liquid paint materials. In particular good results can be obtained, if the model error for the dry and wet characterisation data sets can be kept almost the same. In such a case the performance of correction steps carried out in the wet is in good agreement with the performance of the corresponding sprayed-out paints of the standard correction procedure.

In step A) of the process of the present invention the dry color shade standard is measured. For example, the reflectance spectrum of the dry color shade standard to be matched is measured. Measuring can be done with a spectrophotometer at a single measuring geometry (as, e.g., 45°/0° or d/8°) for solid color shades and at multiple measuring geometries by means of a goniospectrophotometer suited for special effect color shades.

Generally, the corresponding color coordinates as, e.g., the triplet of tristimulus values or the L*, a*, b* values of the more uniform CIELab color space can be used in the present invention instead of using the reflectance spectra, i.e. instead of a spectral match criterion a color space match criterion can also be applied.

The color coordinates, e.g., the triplet of tristimulus values or the L*, a*, b* values of the CIELab color space, can be derived from the measured reflectance spectra in a way well-known to a person skilled in the art or can be measured directly with an appropriate measurement device.

In step B) of the present invention a recipe for the dry color shade standard is calculated based on the measurement result of step A) and on an appropriate radiative transfer model to describe the diffusion of light through particulate media. This is done according to usual recipe calculation methods well known to a person skilled in the art based on dry characterisation data.

As explained already, a prerequisite of the recipe calculation is the knowledge of the optical material parameters of all colored constituents of the available colorant system. They have to be determined experimentally in advance for any colorant of the colorant system by means of a calibration echelon. The respective calibration echelon to be produced is of course closely connected to the radiative transfer model utilized. In the isotropic case two material parameters have to be determined, namely the scattering and absorption coefficients, respectively. For this purpose at least two different blends of different coloristic behaviour have to be measured. The model explicitly accounting for the anisotropy of scattering events contains further wavelength-dependent material constants used for the parametrisation of the phase function. In case of a neural network model the optical properties of all pigments are hidden and captured in the weights of the network structure.

In case of solid pigments the well-known Schuster-Kubelka-Munk or two-flux approximation to the general radiative transfer equation is usually adopted. Within the scope of the two-flux approximation a simple relationship can be derived between the reflectance $R_{ext}(\lambda)$ of an opaque surface coating and the scattering (S) and absorption (K) coefficients of the individual pigments:

$$R_{ext}(\lambda) = \alpha r_{ext} + \frac{(1-r_{ext})(1-r_{int})R_{int}(\lambda)}{1-r_{int}R_{int}(\lambda)},$$

where $$R_{int}(\lambda) = 1 + \frac{K(\lambda)}{S(\lambda)} - \sqrt{\left(1+\frac{K(\lambda)}{S(\lambda)}\right)^2 - 1}.$$

The external ($r_{ext}$) and internal ($r_{int}$) Saunderson coefficients correct for the reflection effects of the refractive index discontinuity at the air/paint interface. The parameter α must be set to one, if the specular surface gloss component is included in the reflectance signal, and set to zero in case the surface gloss component is excluded from the measurement signal. In case of a perfectly diffuse radiation distribution within the pigmented layer the external ($r_{ext}$) and internal ($r_{int}$) reflection coefficients only depend on the relative refractive index $n = n_{paint}/n_{air}$ of the paint and the surrounding air. For $n=1.5$ the following Saunderson coefficients $r_{ext}=0.04$ and $r_{int}=0.6$ can be estimated, respectively. In an intimate mixture model the scattering and absorption coefficients S and K are additively composed of the individual contributions of the different species of respective concentration $c_i$:

$$K = \sum_{i=1}^{N} c_i k_i,$$

$$S = \sum_{i=1}^{N} c_i s_i,$$

The individual wavelength-dependent optical material parameters $k_i$ and $s_i$ have to be derived experimentally from the spectral reflectance data of all blends defining the calibration echelon.

This phenomenological radiative transfer model for isotropic scattering particulate media can be replaced by any N- or multi-flux approximation of the general radiative transfer equation, where the integration of this equation defines the scope of the application and the accuracy of the derived solution. For non-hiding films the inclusion of collimated radiation fluxes improve the quality of the solution considerably. The formalism can also be extended to stratified media with an arbitrary number of optically different layers.

Within the Schuster-Kubelka-Munk two-flux approximation for non-hiding surface coatings the reflectance is given by the expression $$R(x, K, S) = \frac{1 - r_0[a - b\coth(bSx)]}{a - r_0 + b\coth(bSx)},$$

where x denotes the geometrical film thickness. The quantities a and b are related to the introduced scattering and absorption coefficients by the relations $$a = 1 + \frac{K}{S}, b = \sqrt{a^2 - 1} = \sqrt{\frac{K}{S}\left(\frac{K}{S} + 2\right)}.$$

The quantity $r_o$ denotes the reflectance of the background.

As an example to illustrate the procedure for an alternate and more efficient colour development process proposed in the present patent serves the azimuth-independent form of the radiative transfer equation $$\mu \frac{dI(x, \mu)}{dx} = I(x, \mu) - \frac{\omega_O}{4\pi} \int_{-1}^{+1} d\mu' I(x, \mu') p(\mu, \mu') + I_{inc} \frac{\omega_O}{4\pi} e^{-\kappa x/\mu_O},$$

in which $I(x,\mu)$ denotes the specific intensity at geometrical depth x within the pigmented plane-parallel layer and $\mu = \cos^{-1} \theta$ the cosine of the polar angle θ (in analogy $\mu_o$ represents the cosine of the angle $\theta_o$ of incident light). The redistribution function $p(\mu,\mu')$ describes the process of how radiation impinging on a pigment particle is distributed over all directions in space. For isotropic scattering media the relation $p(\mu,\mu')=1$ applies. In case of anisotropic scattering media for $p(\mu,\mu')$ an appropriate parametrised function has to be identified to describe the characteristic scattering properties of the respective pigments to a sufficient degree of accuracy. For numerical stability and performance reasons the number of parameters of the redistribution function should kept as low as possible.

Further optical material parameters as the absorption coefficient α and the scattering coefficient σ of a pigment particle have been condensed in the albedo $$\omega_O = \frac{\sigma}{\sigma + \kappa}$$

of single-particle scattering. The albedo $\omega_o$ can be interpreted as probability for scattering of light impinging on a particle. The optical material parameters (α,σ) are defined slightly differently than the analogous quantities (K,S) of the phenomenological two-flux model of Schuster-Kubelka-Munk and are therefore differentiated in notation. The boundary conditions of the scattering problem as the refractive index discontinuity at the air/paint interface as well as the reflective properties of the background have to be accounted for explicitly when integrating the radiative transfer equation. Within the framework of the formalism also multi-layer models can be treated.

Empirical approaches for computer-aided colour matching based on artificial neural networks (ANNs) have also been devised in the literature (WO 02/063556 A2, WO 02/063557 A2). In this model-free ANN approach the neural network takes the role of the traditional radiative transfer model. Networks of appropriately chosen topology are trained by means of a representative set of training panels. If the training set is chosen carefully the network should develop the capability to generalise and interpolate with desired degree of accuracy. The performance of a trained ANN has to be validated by means of an independent set of test panels.

In step B) of the present invention a recipe for the dry color shade standard can also be identified, for example, from a database, based on the measurement result of step A).

The database usually contains color recipes and the corresponding measured color data, i.e. the measured reflection spectra and/or the color coordinates. Usually those databases are used in vehicle repair coating business by end-users as, e.g., in a repair body shop. The databases usually contain a number of pre-developed color formulas based on a defined colorant system, i.e. a defined assortment of colorants. The measured reflectance spectra and/or the color coordinates of each color formula are also stored in the database. Identification of a suitable color formulation is carried out on the basis of the stored reflectance data and/or the color coordinates as selection criterion.

In step C) of the process of the present invention a virtual wet color shade standard is generated based on the recipe for the dry color shade standard calculated or identified in step B), wherein the virtual wet color shade standard is generated with wet characterisation data. The wet characterisation data have been determined in advance in the same way as explained above for determination of the dry characterisation data and also stored in a database. The virtual wet standard can be provided in form of a synthesised reflectance spectrum or in form of the corresponding color coordinates derived thereof.

The details of creating the virtual wet standard shall be explained below.

In color development four sources of error may have a significant impact on the performance of an instrumentally aided matching process: (i) the capability error (color gamut), (ii) the model mismatch error (approximation), (iii) random errors (sample preparation, measurement, etc.), and (iv) bias errors (process mistakes, instrument scales, etc.).

color match error=capability error+model mismatch error+random error+bias error

The capability error occurs if adjustment of the amounts of ingredients in a color formula is not capable of an isomeric match to a color standard. The color gamut of the color formula does not contain the color position of the standard. If the residual color difference exceeds the agreed tolerance, the best match will be unacceptable. Capability errors can only be eliminated by choosing the right pigmentation in a formulation. If the right pigments are not available in a given colorant system, an isomeric match is not feasible.

The second error source of model mismatch in general is non-zero and denotes the color difference between a synthesised reflectance spectrum of a color formula and the corresponding experimentally measured reflectance spectrum of the sprayed-out panel. This is a measure of the performance of a pigment mixture model and can be influenced by choosing an appropriate radiative transfer model and optimising the associated model parameters.

Random errors are always present in practical sample preparation and measurement applications and can be considered to comprise the totality of all process variations affecting a sample prepared to represent a color formula. Typical components for this error category are tint, mixing, spraying, and measurement variations. The impact of such errors can only be minimised by carefully analysing and designing the process.

The fourth category of bias or special cause errors comprises all samples corrupted by true process mistakes and misadjustment of measurement equipment. Such errors represent a challenge to the robustness of the color development process and have to be avoided by implementing appropriate control strategies.

If the model error of the dry and wet characterisation data sets is comparable, the matched formula $c_d$ in the dry can be utilised to synthesise a reflectance spectrum in the wet almost resembling the corresponding reflectance spectrum of the physical wet standard. Therefore, this reflectance spectrum of a virtual wet standard may serve as a new target in the color development process. Part of the color development process can now be carried out in the wet. The performance of the concept of virtual wet standards is expected to be efficient in those cases, where characterisation data based on congruent blend patterns for both dry and liquid paint materials have been prepared and processed. Only in such cases the model error is expected to cancel out. Otherwise fidelity of the methodology will deteriorate with increasing deviation from consistency between dry and wet blend patterns.

Figure 3:
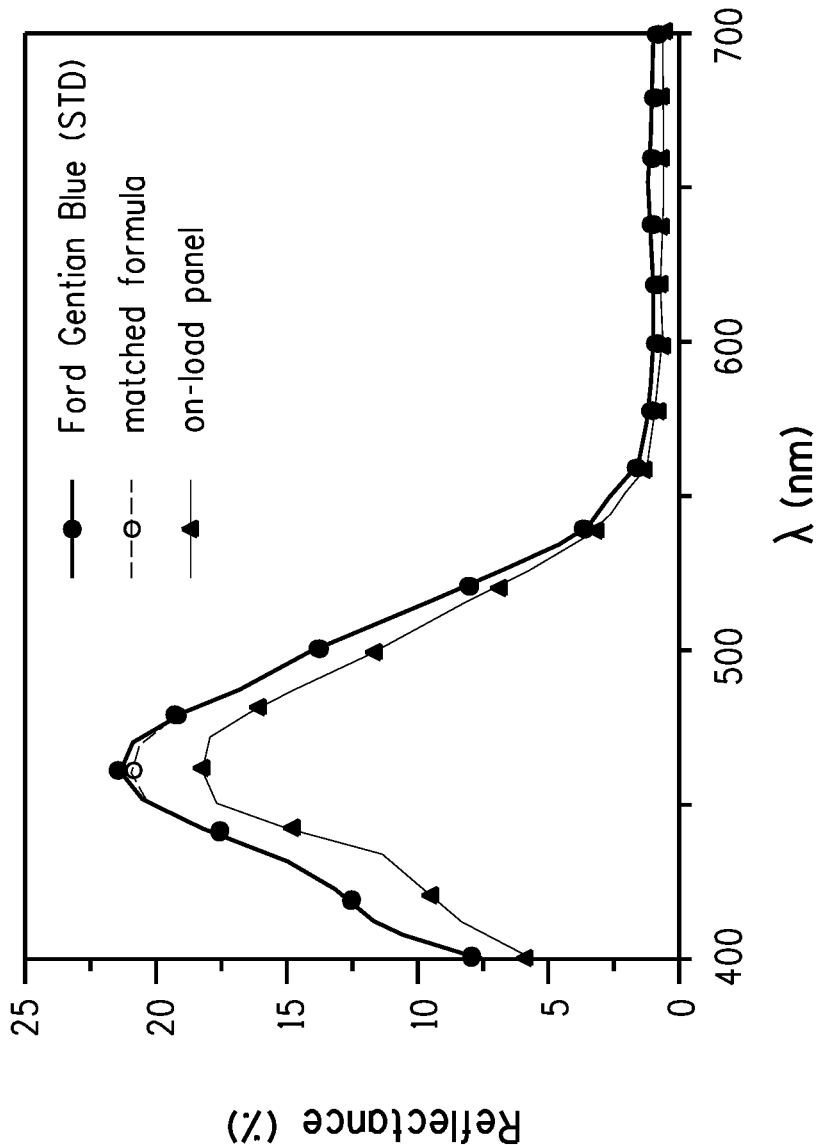
FIG. 3 shows the reflectance spectra of a measured standard (Ford Gentian Blue; closed circles), of the corresponding predicted formula (open circles), and of the measured sprayed-out on-load panel of the predicted formula (open triangles).

The first step in color development is the determination of an isomeric match by means of a recipe calculation program. If the chosen colorant assortment contains the right pigments and an isomeric match is feasible, the measured reflectance spectrum of the standard and the predicted reflectance spectrum of the selected set of ingredients are always in good agreement with each other (see FIG. 3). However, if the predicted formula is sprayed-out due to the impact of process errors there will always be an appreciable color difference between the color standard and the sprayed-out paint formula being larger than between standard and predicted spectrum.

If the paint system used is also characterised in the wet using the same or similar blends to those which have been used to generate the dry characterisation data set, then the model error of both dry and wet characterisation data sets is about the same and there is a high chance to match the unknown wet standard quite well by using the formula of the dry prediction and synthesise a corresponding wet spectrum with the wet characterisation data. This synthesised reflectance spectrum can serve in the subsequent recipe correction steps as the new virtual wet standard. This virtual wet color standard will always be close to the physical wet standard, which means that a significant part of the recipe correction steps can now be carried out in the wet which is supposed to be much cheaper and quicker than the standard procedure based on sprayed-out paints.

Finally a virtual wet standard can be created which serves as wet standard for the following shading step or steps. Therefore, existence of a physical wet standard is not necessary.

In step D) of the process of the present invention the virtual wet color shade standard is matched. This is done according to the usual procedure of color matching. Therefore, according to one embodiment the method of the present invention, in particular step D), further comprises the steps E) to G).

According to step E) a paint is prepared based on the recipe for the dry color shade standard calculated or identified in step B). The liquid paint is then measured according to step F). When measuring the reflectance spectrum of the liquid paint well-known methods and devices for measuring liquid paint films can be used. A method for measuring optical parameters on liquid paints is disclosed, for example, in U.S. Pat. No. 6,583,878, where a liquid paint is applied to a continuously moving cylindrical support. A film of the liquid paint is formed on the cylindrical support and its optical parameters can be measured. Also, in DE 2525701 a method is described, wherein a continuous thin liquid film is formed from the paint to be measured. The liquid film may be a film moving with the support or with a laminar flow over a support. In the first case the support is a measuring disk that is rotatable about a horizontal axis, and in the second case it is a plate-like body having an approximately vertical surface.

Then the liquid paint is assessed to verify whether it is within a required tolerance compared with the virtual wet standard (step G). The assessment of the quality of a match can be made strictly visually or instrumentally, or a combination of both approaches may be utilised. In case of an instrumental assessment depending on the area of application (as, e.g., Refinish, Industrial or OEM coatings) and associated acceptance solid various metrics may serve as a termination criterion for the color development process. Typically the residual color difference in a uniform color space (as, e.g., CIELab-76 or DIN-99) or a specific color difference formula (as, e.g., CIE94 or CIEDE2000) is adopted for this purpose, where a threshold value is agreed on separating accepted and rejected color regions. In case of gonioapparent colors a generalisation of the formalism has to be made to properly account for the angular dependence of the color appearance.

If the liquid paint composition is not within a requested tolerance, a corrected recipe for the liquid paint composition is calculated according to step H). Then again a paint composition is prepared according to the corrected recipe for the liquid paint composition calculated in step H) according to step I). The liquid paint prepared in step I) is then measured (step J) and again the quality of match is assessed by comparing the measurement result with the virtual wet color standard (step K). Steps H) to K) are repeated until the liquid paint composition is within a requested tolerance.

If the liquid paint composition prepared in step E) or I) is within a requested tolerance the paint composition prepared in step E) or I) is applied to a substrate and dried (step M).

Then the quality of match is assessed by comparing the dried paint composition with the dry color shade standard (step N). If the dried paint composition is not within a requested tolerance a corrected recipe for the dried paint composition is calculated (step O). Then again a paint composition is prepared according to the corrected recipe (step P). The paint composition is applied and dried (step R) and the quality of match is assessed by comparing the dried paint composition the dry color shade standard (step R). Steps O) to R) are repeated until the dried paint composition is within a requested tolerance.

It goes without saying that the order of the steps of the method of the present invention is not strictly fixed, but can be changed according to the knowledge of a person skilled in the art.

The color development process according to the present invention is depicted in FIGS. 2A and 2B in form of flow diagrams. The first steps up to the calculation of the on-load position of a dry panel 40-46 are identical to the standard color development process displayed in FIG. 1. Then using the predicted formula for the dry standard, the virtual wet standard reflectance data is calculated by utilising the corresponding wet characterisation data set 48. Hence, the color development process can be switched from the dry to the wet target approach. The mixed formula of the wet prediction is measured and instrumentally corrected in the wet until the virtual liquid target is met within the agreed specifications 50-54, 62-68. For the final liquid formula a panel is sprayed-out and compared to the physical dry target (dry color shade standard) 56, 58, 70, 72. In case of almost equal model errors the expected residual color difference should also be within the agreed specifications or very close to the target area. If this is not the case further correction steps in the dry versus the dry color shade standard have to be carried out until the target area is met 74-82. This part of the modified color development process again is the same as in the standard color development process.

The invention can be used in all areas of application, where colors have to be developed or batches have to be shaded as, for example, in automotive and industrial coatings applications. In automotive coatings the method can be used for OEM coatings as well as refinish coatings as, e.g., in color laboratories, in refinish body shops, in the paint manufacturing process, and in standardisation of paints or standardisation of pigment pastes.

The process is applicable to color shade standards of unknown or of known pigmentation, shading of solid and metallic colors can be performed.

The present invention provides a method for color matching, wherein correction steps usually performed with dry paints (dry panels) can now be replaced by correction steps using liquid paints. Hence, the method reduces the number of tinting steps based on the dry color development process and the cycle time considerably.

Therefore, the matching method of the present invention is a more efficient, time and cost saving method compared with usual known methods for color matching.

The invention is explained more detailed in the following example.

EXAMPLE

The efficiency of the devised modified color development process is demonstrated making use of an example of a solid color shade. This solid color shade has to be matched using a given assortment of tints which have been characterised in the dry and in the wet using identical blend patterns. For the example to be discussed below dry and wet targets (dry and wet color shade standards) are known so that the performance of the dried paint and the liquid paint can be compared directly for a color development carried with liquid paints.

Figure 4A:
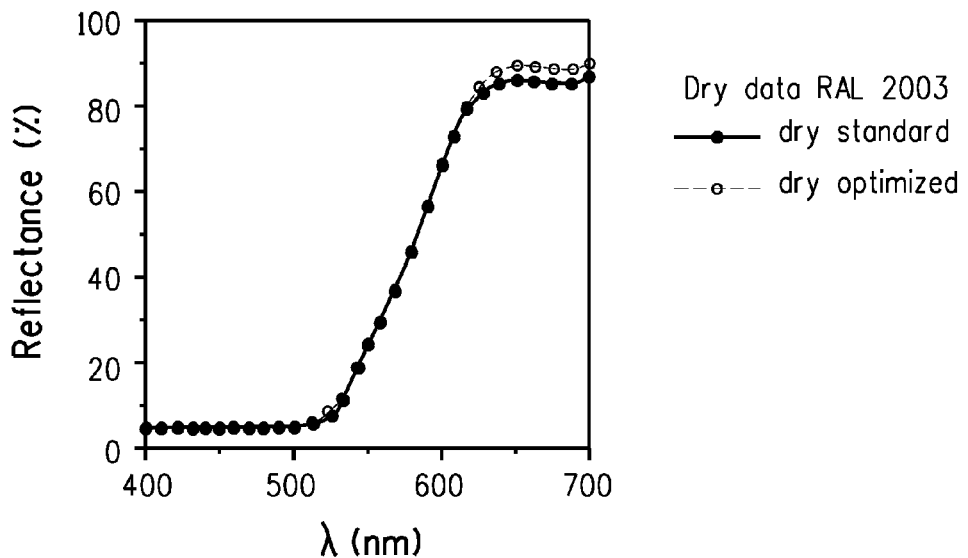
FIG. 4 shows an example for the new colour development process according to the invention. The left diagram displays the measured dry target (colour shade RAL 2003) and the optimised formula of a standard recipe calculation procedure. The right diagram depicts the calculated virtual wet standard in comparison to the true physical wet standard.
Figure 4B:
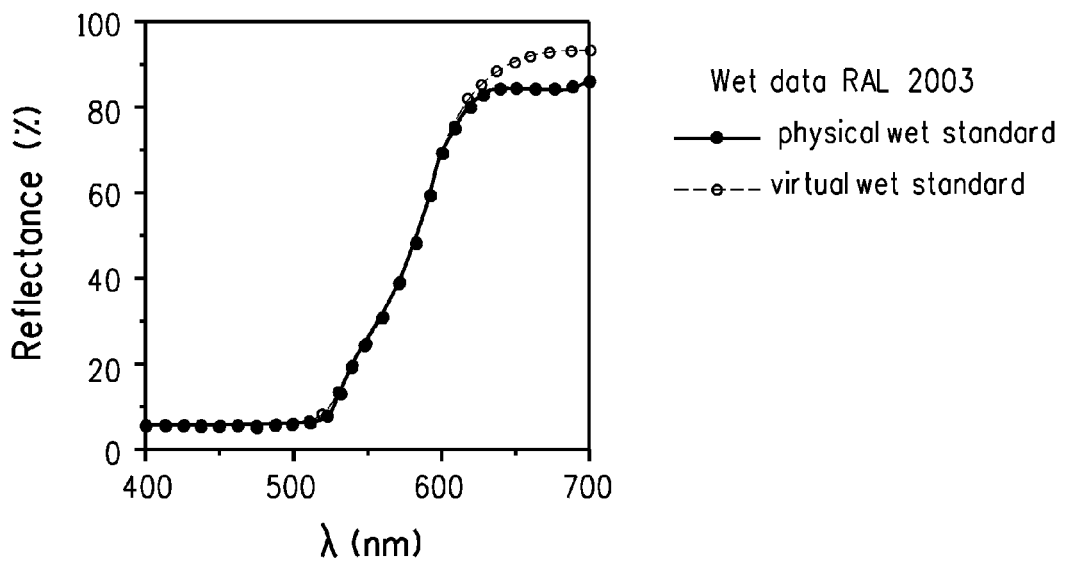

The relevant reflectance data are depicted in FIGS. 4A and 4B. The diagram of FIG. 4A displays the measured reflectance spectrum of standard 2003 of the RAL 841-GL collection of glossy industry colors along with the predicted reflectance spectrum of an optimised formulation $c=(c_1, c_2, \ldots, c_N)^T$ for a typical solvent-based Refinish paint quality. With the exception of the long wavelength range above 630 nm both spectra are almost congruent. In the diagram of FIG. 4B the reflectance spectrum synthesised by means of the wet characterisation data set for the formula c optimised for the dry characterisation data set is displayed. This synthesised reflectance spectrum represents the virtual wet standard for the color development steps in the wet. For comparison purposes the diagram of FIG. 4B also displays the true physical wet standard. A close scrutiny of the diagram of FIG. 4B reveals that the agreement of both reflectance spectra compares favourably to the two corresponding dry spectra shown in the diagram of FIG. 4A.

Figure 5:
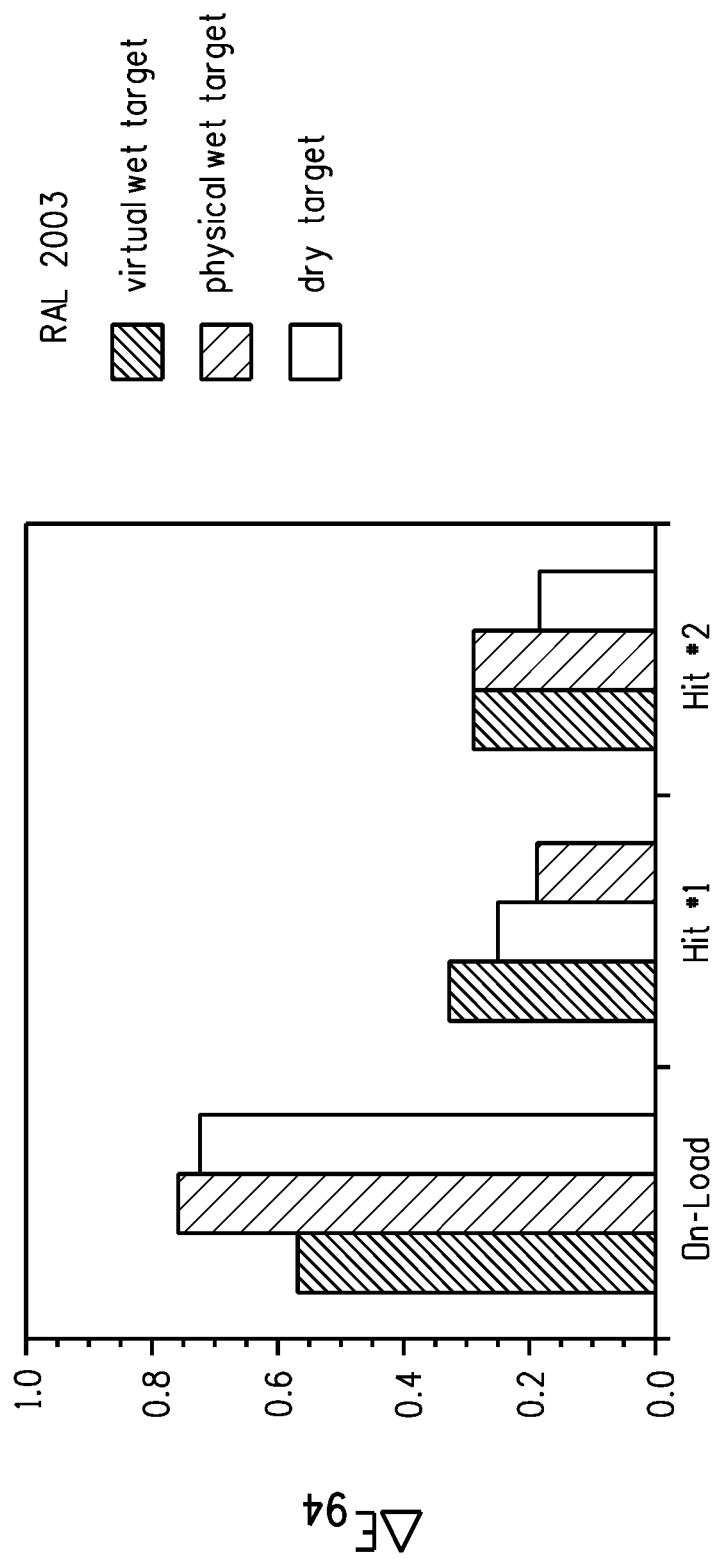
FIG. 5 shows the performance of the new colour development process for colour standard 2003 of the RAL 841-GL system. Colour development has been carried out in the wet against the virtual wet target. The process terminates after the second hit. Along with the wet colour development data at each correction step corresponding residual colour differences of each wet sample to the physical wet target and the sprayed-out panels against the dry standard are displayed.

FIG. 5 displays the residual color difference data for each correction step of the color development process in the wet with the virtual wet standard serving as the standard. The color development process terminates after the second correction step. Along with the wet color development data for each correction step corresponding residual color differences of each liquid paint sample to the physical wet standard and the sprayed-out and dried paint against the dry standard are displayed. The data clearly corroborate the assertion that correction steps usually carried in the dry can be replaced by correction steps in the wet, if the model error for the dry and wet characterisation data sets can be kept almost the same. In such a case the performance of correction steps carried out in the wet is in good agreement with the performance of the corresponding sprayed-out panels of the standard correction procedure.

I claim:

1. Method for matching the color of a dry color shade standard, said method comprising the steps of:
    A) Measuring the dry color shade standard,
    B) Calculating a recipe for the dry color shade standard, or identifying a matching recipe for the dry color shade standard,
    C) Generating a virtual wet color shade standard based on the recipe for the dry color shade standard calculated or identified in step B), wherein the virtual wet color shade standard is generated with wet characterisation data,
    D) Matching the virtual wet color shade standard,
    E) Preparing a paint composition according to the recipe for the dry color shade standard calculated or identified in step B),
    F) Measuring the liquid paint composition prepared in step E),
    G) Assessing the quality of match by comparing the measurement result of step F) with the virtual wet color shade standard generated in step C),
    H) If the liquid paint composition prepared in step E) is not within a requested tolerance, calculating a corrected recipe for said liquid paint composition,
    I) Preparing a paint composition according to the corrected recipe for the liquid paint composition calculated in step H), J) Measuring the liquid paint composition prepared in step I),
K) Assessing the quality of match by comparing the measurement result of step J) with the virtual wet color shade standard generated in step C),
L) Repeating steps H) to K) until the liquid paint composition is within a requested tolerance,
M) If the liquid paint composition prepared in step E) or I) is within a requested tolerance, applying the paint composition prepared in step E) or I) to a substrate and drying the paint composition,
N) Assessing the quality of match by comparing the dried paint composition with the dry color shade standard,
O) Calculating a corrected recipe for the dried paint composition, if the dried paint composition is not within a requested tolerance,
P) Preparing a paint composition according to the corrected recipe for the dried paint composition calculated in step O),
Q) Applying the paint composition prepared in step P) to a substrate and drying the paint composition,
R) Assessing the quality of match by comparing the dried paint composition with the dry color shade standard, and
S) Repeating steps O) to R) until the dried paint composition is within a requested tolerance.

2. The method of claim 1, wherein in step A) the reflectance spectrum is measured.

3. The method of claim 1, wherein in step A) the color coordinates are measured or derived from the measured reflectance spectrum.

4. The method of any one of claims 1 to 3, wherein the recipe for the dry color shade standard is calculated or the matching recipe is identified on basis of dry characterisation data.

5. The method of claim 4, wherein the wet characterisation data and the dry characterisation data are based on congruent blend patterns.

6. The method of any one of claims 1 to 5, wherein the virtual wet color shade standard is generated in form of a reflectance spectrum.

7. The method of any one of claims 1 to 5, wherein the virtual wet color shade standard is generated in form of color coordinates.

8. The method of claim 1, wherein the quality of match is assessed instrumentally and/or visually.

* * * * *